United States Patent [19]
Leatherman

[11] 3,802,985
[45] Apr. 9, 1974

[54] HEATABLE STRATIFIED MATERIAL AND MANUFACTURING METHOD THEREFOR

[75] Inventor: Alfred F. Leatherman, Columbus, Ohio

[73] Assignee: William C. Heller, Jr., Milwaukee, Wis.

[22] Filed: Jan. 6, 1972

[21] Appl. No.: 215,855

[52] U.S. Cl.................. 156/244, 264/177, 264/211
[51] Int. Cl........................ B29c 21/00, B28b 21/54
[58] Field of Search ........... 156/272, 273, 242, 244; 264/171, 211

[56] References Cited
UNITED STATES PATENTS

| 3,715,256 | 2/1973 | Truesdell et al. | 156/272 |
| 3,535,184 | 10/1970 | Schwartz | 156/273 |
| 3,477,194 | 11/1969 | Corrsin | 156/272 |
| 3,391,846 | 7/1968 | White | 156/273 |
| 3,461,014 | 8/1969 | James | 156/272 |
| 3,574,031 | 4/1971 | Heller, Jr. et al. | 156/272 |
| 3,706,176 | 12/1972 | Leatherman | 156/272 |
| 3,549,451 | 12/1970 | Kugler | 156/272 |
| 2,632,205 | 3/1953 | Harris | 156/244 |
| 3,148,412 | 9/1964 | Speeuwers | 264/211 |
| 3,679,788 | 5/1970 | Kiyono et al. | 264/211 |

Primary Examiner—Douglas J. Drummond
Attorney, Agent, or Firm—Andrus, Sceales, Starke & Sawall

[57] ABSTRACT

A stratified thermoplastic material having a susceptor in one of the layers is formed by coextrusion. The susceptor is heatable by indirectly applied energy so that article parts formed of the stratified material may be thermally joined together to form plastic articles.

16 Claims, 10 Drawing Figures

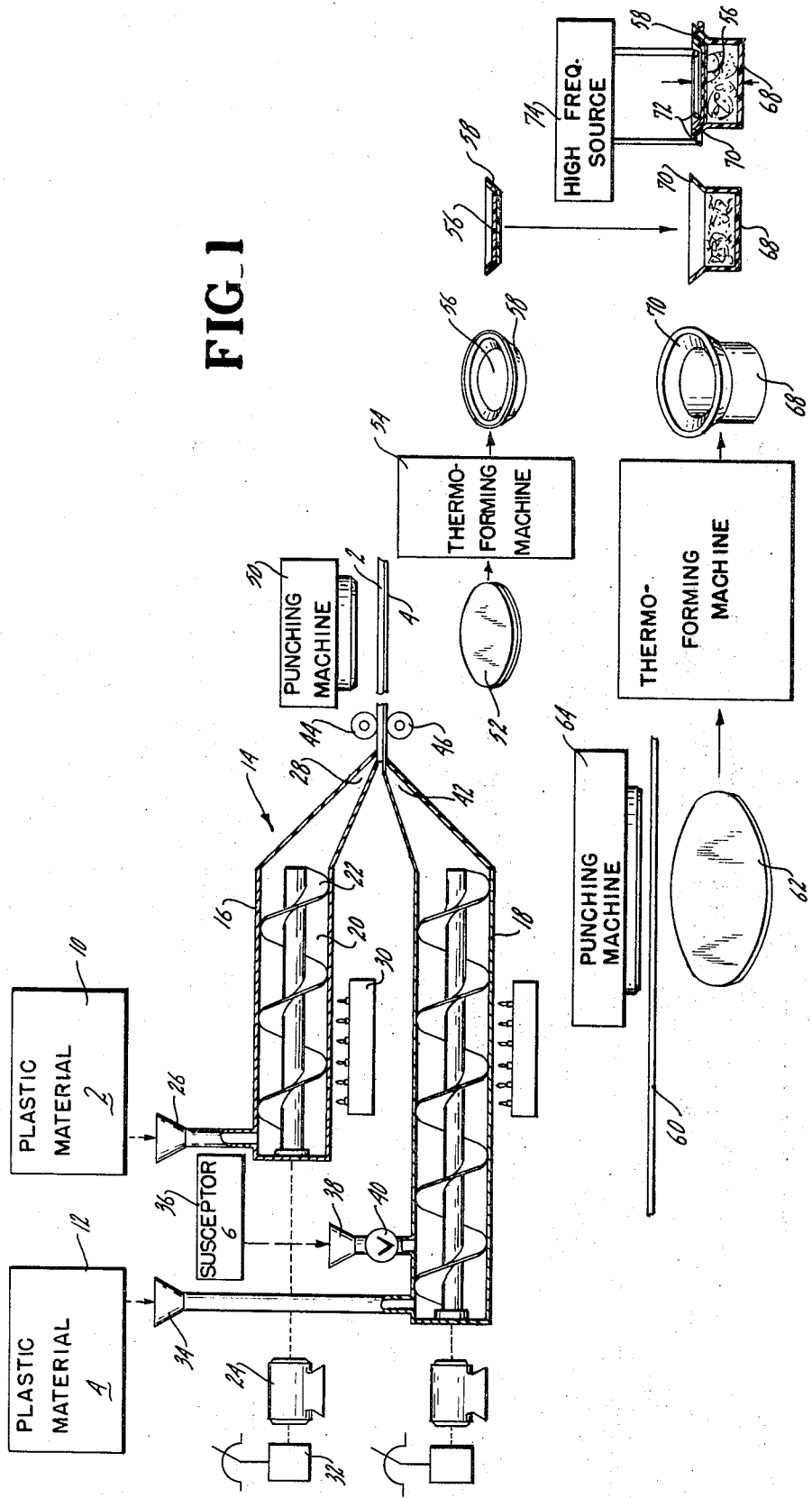

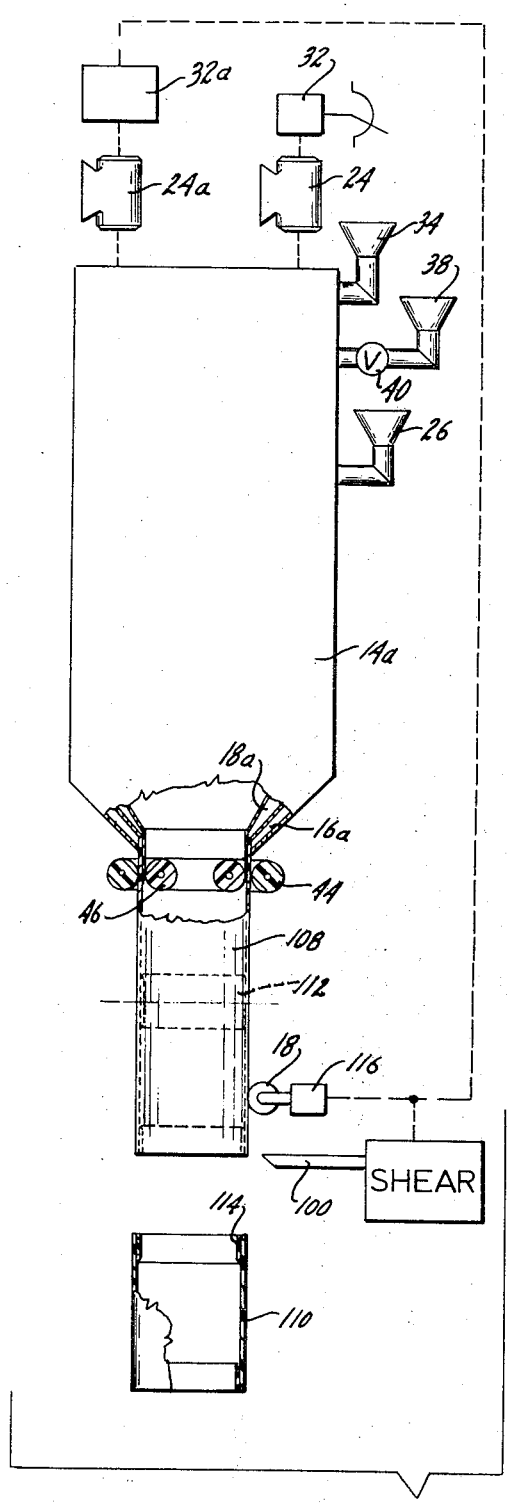
FIG_6
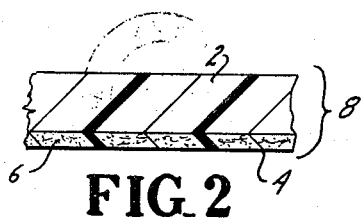
FIG_2
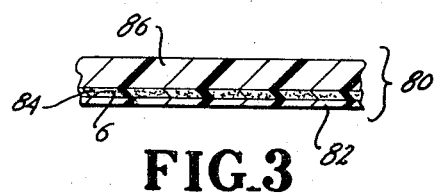
FIG_3
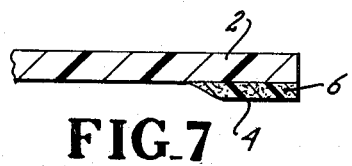
FIG_7
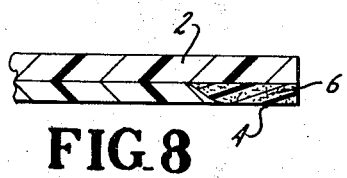
FIG_8
FIG_9
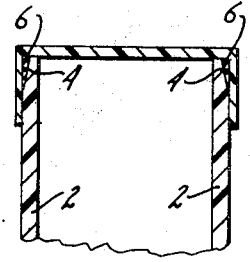
FIG_10

PATENTED APR 9 1974

HEATABLE STRATIFIED MATERIAL AND MANUFACTURING METHOD THEREFOR

BACKGROUND OF THE INVENTION

1. Field of the Invention

The present invention relates to stratified or layered plastic materials, to methods of forming same, and to articles incorporating such materials.

2. Description of the Prior Art

In addition to their other highly desirable properties, most commonly used plastic materials possess the property of heat sealability. This property permits joinder of plastic parts to form an infinite variety of plastic articles by thermal fusion bonding and like techniques.

In many cases, the heat for joinder is externally applied, as by heated bars, shoes, or jaws. However, recent developments have shown the superiority of incorporating a heat generating agent directly in the article parts themselves. This may typically be accomplished by dispersing in the plastic, a particulate material which is susceptible to heating by indirectly applied energy. The indirectly applied energy may be in the form of an alternating magnetic field, in which case heat generation is by eddy current losses or hysteresis losses.

The advantages of the aforesaid technique include, among others, concentration of the heat at or near the bonding interface, close control of bonding temperature, and ease of handling since no adhesive or other bonding accessories are required.

However, many of the susceptible particulate materials, hereinafter termed susceptors, possess undesirable colorations. For example, a highly useful class of heat generating materials includes metal oxide particles having ferromagnetic properties which render them susceptible to heating by an alternating magnetic field. However, these particles exhibit distinct color properties. For example, the iron oxides $Fe_2O_3$ and $Fe_3O_4$, both of which are very efficiently heated by alternating magnetic fields, are brown and black respectively, in color. As most common plastics are at least to some degree transparent, the dispersion of the iron oxide particles turns the plastic brown or black. This coloration may be aesthetically undesirable or unacceptable.

Thus, it is often desirable to mask the coloration caused by incorporation of the susceptor with an opaque layer, for example, a white layer, to hide the particle coloration. The result is a multi-layer structure having a heat generating layer and an opaque masking layer.

In a more general aspect, it may be desirable to provide a heatable stratified plastic structure which advantageously combines the desirable properties of several different types of plastics. For example, in addition to the heat generating layer, other layers of the stratified material may present a barrier to gas and/or moisture transmission or give strength, bulk, grease and scuff resistance, or heat resistance to the material.

While not limited thereto, composite plastic materials of the type described immediately above have numerous potential applications in the container and packaging art. For example, the common tin can container while possessing many advantages, including relatively low cost, non breakability, high heat resistance, etc., has several disadvantages, such as contamination of the contents of the can in the event the integrity of the tin or varnish coatings on the steel material is lost, difficulty in opening, etc. However, the provision of a feasible plastic container to replace the ordinary tin can has proven elusive to date. One of the reasons for this has been the unavailability of a plastic substance having all the properties necessary for the material for such a container. Another problem is that of joinder of the parts of the container. The use of adhesives are undesirable because of possible contamination of the contents. Heat seal bonds formed by heated bars, and the like, have left much to be desired in terms of integrity of the bond and strength.

SUMMARY OF THE PRESENT INVENTION

It is, therefore, the object of the present invention to provide an improved method for forming a stratified material having internal heat generating means.

It is a further object of the present invention to provide an improved method of forming a plastic article from such materials.

It is yet another object of the present invention is to provide an improved stratified plastic material including internal heat generating means and to provide articles formed from such material.

The present invention utilizes the technique of coextrusion to provide the aforesaid stratified material. Coextrusion is a specific aspect of a more general plastic forming technique termed extrusion. To form plastics by extrusion, the plastic material is placed in a malleable state, as by application of heat thereto, and forced through a die under pressure. In coextrusion, two or more plastic materials are placed in a fusible state and extruded. Before, during, or after the plastic materials emerge from the dies, they are intimately bonded together to form a stratified material.

In the present invention, a particulate susceptor is incorporated in one of the coextruded plastic materials, thereby to provide a stratified material including a heatable layer. Coextrusion is particularly useful in the formation of such stratified materials as the heatable layer may be thicker than that which can be provided by coating or other methods. Further, the strength of the bond between coextruded strata is extremely high and far exceeds that obtainable by adhesive coating techniques.

In many cases, the cost of providing a heatable stratified plastic material by the method of the present invention is considerably less than that of other techniques, such as coating, and the like. This is reflected in a reduction in the cost of plastic articles utilizing such materials and methods. In the case of plastic can-like containers noted above, it appears possible to provide such containers at one third the cost of conventional tin cans through the use of the present invention.

In providing a container or other article, the stratified material formed as above is shaped into one or more parts of a plastic article. The parts of the article, including those formed of the stratified material, are assembled and the stratified material is exposed to indirectly applied energy at the areas of contact with the other parts to heat the suspector, the stratified material, and the adjacent portions of the other article parts to thermally join the parts together to form the completed article.

BRIEF DESCRIPTION OF THE DRAWING

FIG. 1 is a partially diagrammatic illustration of the practice of the method of the present invention. FIG. 1 further shows a novel article formed by the method of the present invention.

FIG. 2 is a detailed, partial, cross sectional view of one embodiment the stratified material formed by the method of the present invention.

FIG. 3 is a detailed, partial, cross sectional view of another embodiment of the stratified material formed by the method of the present invention.

FIG. 4 shows another novel article.

FIG. 5 also shows a novel article formed by the method of the present invention.

FIG. 6 is a partially diagrammatic illustration of the practice of another embodiment of the method of the present invention. FIG. 6 further shows a novel article portion formed by the method of the present invention.

FIG. 7 is a detailed, partial, cross sectional view of the article portion shown in FIG. 6.

FIGS. 8 and 9 are detailed, partial, cross sectional views showing modifications of the stratified material shown in FIG. 7.

FIG. 10 is a partial, cross sectional view showing an article formed of the stratified material shown in FIG. 9.

DESCRIPTION OF THE PREFERRED EMBODIMENT

Figure 4:
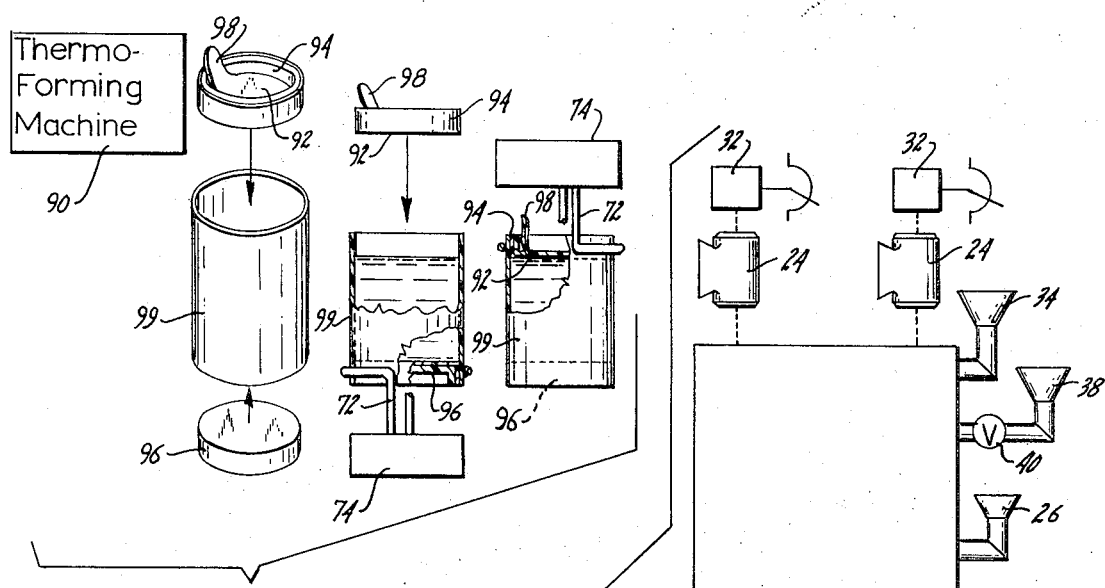
FIG. 4 is a partially diagrammatic illustration of the practice of another embodiment of an article forming method.

While in the drawings identified above, and in the description below, the present invention is described in the context of a stratified material having heat sealing properties suitable for use in forming articles by thermal joinder, it will be appreciated that the application of the invention is not so limited. The stratified material may incorporate any heat responsive material in addition to the heat generating layer and the resulting product may be employed in a wide variety of articles or other applications. Hence, the following description of exemplary embodiments of the invention is not intended to limit the present invention, except in so far as the invention is defined in the appended claims.

FIG. 1 shows the process steps in forming, by coextrusion techniques, a stratified material including a layer having heat generating means. Initially, the plastic materials for the layers of the stratified structure are selected. These materials may be of the same type, for example, all polyethylene, all polypropylene, or all polystyrene, or may be different types so as to provide a composite structure incorporating the desirable properties of a plurality of plastic materials. However, since the integrity of a coextrudable structure depends on the fusion-like bond obtained between the layers, it is desirable that the plastic materials forming the stratified structure be thermally fusible.

In FIG. 1, a two layer stratified material is formed, and hence two plastic compositions are employed. For purposes of explanation, it may be assumed that the coextruded stratified material consists of a 10 mil joinder layer of polyethylene containing the susceptor and a 40 mil layer, also of polyethylene, which provides structural strength to the material. The 40 mil layer may also be pigmented to mask the coloration of the 10 mil layer by the dispersion of a filler, such as titanium dioxide, in the layer. The coextrusion technique of the present invention provides a heatable polyethylene structure at considerably less cost than if the susceptor material was dispersed throughout the entire 50 mil thickness of the material. The stratified material 8 so formed is shown in FIG. 2 to include masking layer 2 and heatable layer 4 containing susceptor 6.

Another two layer structure might typically consist of a 50 mil layer of an acrylonitrile copolymer having a 10 mil layer of the acrylonitrile copolymer containing the susceptor.

Susceptor 6 comprises a particulate substance heatable by a selected form of indirectly applied energy. The susceptor may be in the form of granules of solid material or droplets of liquid material incorporated in the plastic of the carrier layer. In the instance in which the indirect energy is applied in the form of an alternating magnetic field, the susceptor may comprise an inductively heatable substance. Susceptors comprising, at least in part, metallic oxides having ferromagnetic properties are suitable for use as an inductively heatable susceptor 6. The oxide compounds, gamma $Fe_2O_3$, $Fe_3O_4$ and $CrO_2$ have been found to be useful susceptors. In addition to their high heat generating properties by hysteresis losses such compounds may be reduced to extremely small size. This size reduction is without loss of heat generating properties and facilitates the dispersion of susceptor 6 in layer 4. Metallic oxide susceptors may be reduced to submicron particle sizes, for example 0.01 microns. A typical maximum particle size is 20 microns. The amount of such particles utilized depends on the heating rates desired in heatable layer 4. The amount of particulate susceptor may range from less than 1% to 30% or more by weight with respect to the plastic of layer 4.

For purposes of the present exemplary description, it may be assumed that susceptor 6 is an iron oxide, inductively heatable by an alternating magnetic field.

Plastics 2 and 4 will usually be of extrusion grade and are commonly provided in pellet or flake form. Plastic material 2 is placed in hopper 10 while plastic material 4 is placed in hopper 12. Hoppers 10 and 12 supply the plastics to coextrusion machine 14.

Coextrusion machine 14 may comprise a pair of extrusion passages 16 and 18, each of which comprise a tubular passage down which a plastic material may be propelled toward an extrusion die. For example, extrusion passage 16 includes tube 20. Auger 22 rotated by motor 24 is positioned in tube 20 to receive plastic material 2 from hopper 10, via loading apparatus 26, and move the material toward extrusion die 28. In the method of FIG. 1, a coextruded flat sheet is formed. For this purpose, extrusion die 28 may comprise the end of tube 20 formed as an elongated slot. Or, a separate extrusion die may be affixed to the end of tube 20. The plastic material may be heated to the fusible state during its passage down tube 20, as by heater 30. The speed of motor 24 is regulated by control 32.

Extrusion passage 18 is similar in construction to extrusion passage 16. Plastic material 4 in hopper 12 is supplied to extrusion passage 18 by loading apparatus 34. Since plastic material 4 which is formed in passage 18 carries particulate susceptor 6, it is necessary to provide some technique for admixing the two substances.

This admixture may be done prior to coextrusion if desired. For example, plastic material 4 and particulate susceptor 6 may be milled on hot rolls to provide the desired admixing action. The resulting products may be formed into a sheet, ground up, and placed in hopper 34.

It is also possible to provide the desired mixing action in extrusion passage 18. For this purpose, hopper 36 is provided for the particulate susceptor material. The particulate susceptor 6 feeds into loading apparatus 38.

In the process of the present invention, plastic material 4 passes from hopper 12 into loading apparatus 34. The particulate susceptor 6 passes from hopper 36 into loading apparatus 38. A valve 40, or other control means may be provided to regulate the amount of susceptor material provided. As auger screw 22 in extrusion passage 18 moves plastic material 4 and the susceptor material down extrusion passage 18, plastic material 4 and susceptor 6 become mixed. The heating of plastic material 4 to the fusible state by heater 30, combined with the agitation provided by auger 22 causes susceptor 6 to be incorporated in plastic material 4 as the plastic material approaches extrusion die 42 at the end of extrusion passage 18. Extrusion die 42, either as the end of extrusion passage 18 or as a separate element, may be formed as an elongated slot.

Plastic material 2 feeds from hopper 10 into loading apparatus 26. Auger screw 22 moves plastic material 2 down extrusion passage 16, where it is placed in the fusible state by heater 30. The filler material necessary to render plastic material 2 opaque may be incorporated in the plastic material prior to extrusion or it may be dispersed in plastic material 2 in extrusion passage 16 in a manner similar to that described above in connection with susceptor 6.

Extrusion die 28 and extrusion die 42 are positioned so that before, during, or after the layers of plastic material 2 and plastic material 4 emerge from the extrusion dies, they are placed in contact and fused together. The coextrusion process provides sufficient mixing of plastic material 2 and plastic material 4 to provide a high strength bond without excessive dispersion of one plastic material within the other. Pressure rolls 44 and 46 may assist in the formation of the intralayer joinder. The process is completed by cooling the coextruded materials to the solid state.

The result is a stratified material 8 having the plastic material 2 layer on top and the plastic material 4 layer containing particulate susceptor 6 on the bottom, as shown in FIG. 2. The thickness of the plastic material layer may be controlled by the size of dies 28 and 42, the speed at which augers 22 are rotated by motors 24, the screw configuration of augers 22, the diameters of extrusion passages 16 and 18, the temperatures of plastic materials 2 and 4, etc.

FIG. 1 also shows a method for forming a container article incorporating the stratified material 8 produced by the above described method. In the disclosed exemplary embodiment, the stratified material 8 forms the lid of a container article. To this end, the stratified material 8 is placed under punching machine 50 which punches a disc-like container lid blank 52 therefrom. Blank 52 is heated in thermo-forming machine 54 to provide lid 56 having an upturned sealing lip 58. Plastic material 4 containing susceptor 6 forms the outer surface of sealing lip 58.

The bottom of the container article is formed from a sheet of plastic material 60. Plastic material 60 is selected to be thermally joinable to the plastic material 4. A container bottom blank 62 is provided from sheet 60 by punching machine 64. Blank 62 is passed through thermo-forming machine 66 to form container bottom 68 having flange 70 designed to mate with lip 58 of lid 56.

After filling container bottom 68, lid 56 is placed on container bottom 68 with lip 58 in abutment with flange 70. An induction heating coil 72 is placed adjacent lip 58 and flange 70.

Upon the energization of induction heating coil 72 by high frequency source 74, susceptor 6 becomes heated by the alternating magnetic field, heating plastic material 4 and the abutting portions of flange 70. The frequency of the alternating magnetic field may be selected in accordance with desired heating rates, type of susceptor, etc. The frequency may typically be from 450 kilohertz to 5,000 megahertz. For a coil type generator the maximum frequency is typically 35–50 megahertz. After heating plastic material and flange 70 to the thermal joining temperature, coil 72 may be deenergized and pressure applied to lid 56 and bottom 68, as shown by the arrows in FIG. 1, to complete the joinder of lid 56 and container bottom 68. The time required for heat sealing will depend on susceptor type and loading, field frequency, etc., but is typically less than 1 second.

While stratified material 8 is shown as a two element structure in FIG. 2, additional layers may be incorporated in the material, as shown in FIG. 3. In that Figure a three element material 80 is shown having a 3 mil heat sealable layer 82 of high density polyethylene, a 5 mil heat generating and barrier polyvinylidene chloride layer 84 containing susceptor 6, and a 20 mil high density polyethylene layer 86 which provides structural strength to the material.

FIG. 4 shows a method of forming a plastic container, similar in form and shape to an ordinary tin can. A stratified material is produced by coextrusion, as shown in FIG. 1. The stratified material is formed, as by thermo-forming material 90, into a circular container lid 92 having an annular flange 94. Plastic material 4 containing susceptor 6 is located on the outside of flange 94. A bottom 96 for the container is also formed in a similar manner. As lid 92 and bottom 96 are punched from the coextruded stratified material, score or tear lines may be cut into plastic material 2 to facilitate the opening of the container. Or a pull tab 98 may be affixed to the lid. If desired, pull tab 98 may be bonded to lid 92 by heating the susceptor 6 in plastic material 4 to soften plastic material 2 and allow affixation of pull tab 98.

The body for the container may be formed from tubular stock which is cut to form body 99 having the desired length.

Bottom 96 is inserted in one end of tubular body 99, as shown in FIG. 4, so that plastic material 4 on flange 94 is contiguous with the inside of body 99. Induction heating coil 72 is placed adjacent the end of body 99 and energized. The resulting magnetic field heats susceptor material 6, flange 94, and container body 99 forming a thermal joint between bottom 96 and container body 99.

The container may then be filled and closed by lid 92. Lid 92 is bonded to body 99 by a process similar to that used to bond bottom 96 to body 99.

To open the container, lid 92 or bottom 96 is broken open by conventional can opening means or by the use of pull tab 98.

It will be appreciated that with both the container shown in FIG. 1 and the container shown in FIG. 4 no additional elements other than the lid and body are required, thereby facilitating the sealing of the containers.

Figure 5:
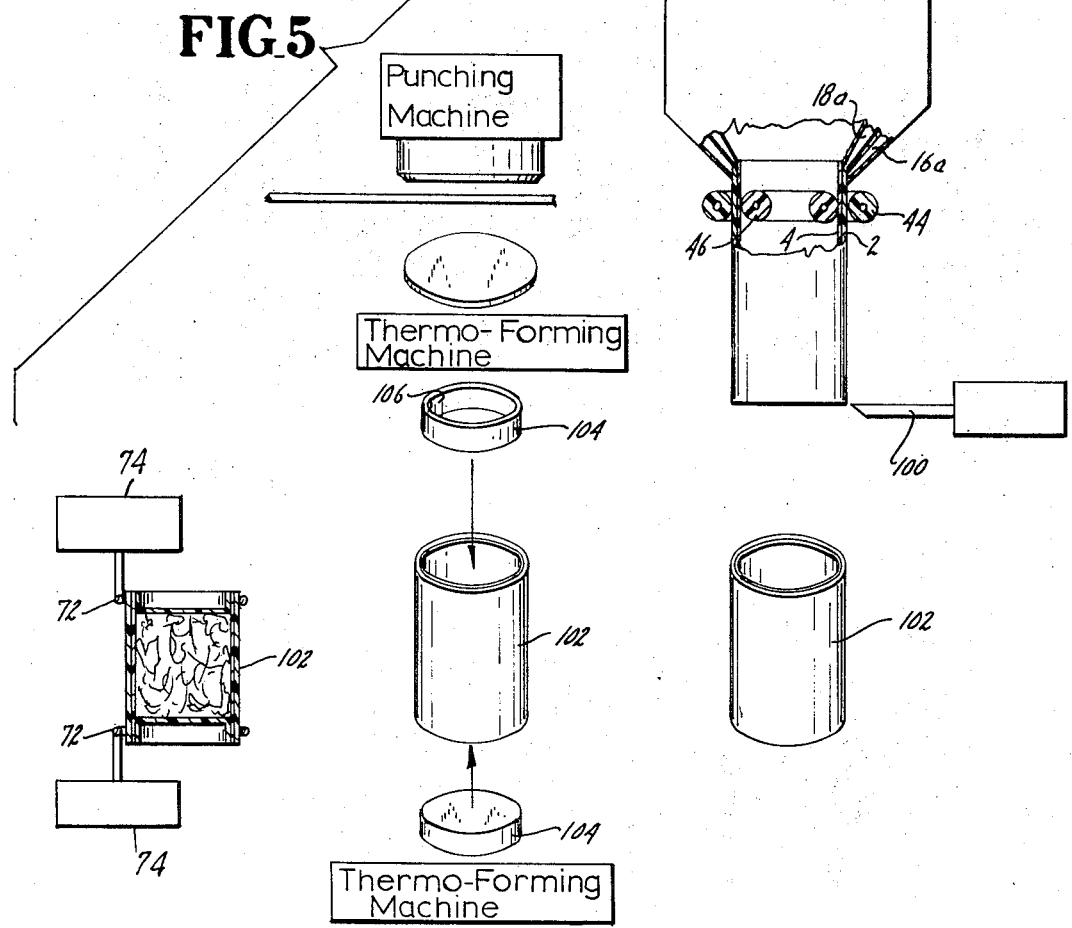
FIG. 5 is a partially diagrammatic illustration of the practice of another embodiment of the method of the present invention.

While the method and article of FIGS. 1 and 3 show the use of a stratified structure in forming the closure element of a container, stratified structures may also be utilized in the body of the container. In FIG. 5, coextrusion machine 14a provides a tubular product rather than a sheet product, as shown in connection with coextrusion machine 14 of FIG. 1. Coextrusion machine 14a illustrates two extrusion passages 16a and 18a fed by loading apparatus 26 and 34, respectively. The extrusion passages and the extrusion dies are concentrically arranged so that a cylinder of plastic material 2 is formed having a layer of plastic material 4 and susceptor 6 intimately joined to the inside of the cylinder.

The coextruded tubular stock so formed is cut to length by shear 100 to form tubular container bodies 102. The lid and bottom 104 for container body 102 are punched from a plastic sheet and thermo-formed to include flange 106. Lid and bottom 104 are inserted in body 102 and joined by induction heating coil 72 in the manner described above. Susceptor 6 in container body 102 may additionally serve as a light barrier to protect the contents from deterioration by exposure to light.

While susceptor materials, such as iron oxide, are quite low in cost, thereby permitting their use throughout articles formed from the stratified structure, it may, in some cases, be desirable to provide the susceptor only at the locations at which heating is desired. FIG. 6 shows an example of this technique in which the susceptor material is provided only at the locations at which heat sealing is desired.

The tubular stock 108 for container bodies 110, similar to container bodies 102 shown in FIG. 5, is formed. However, instead of continuously coextruding the coaxial cylinders of plastic materials 2 and 4, plastic material 4 is only intermittently coextruded on the inside of the plastic material 2 cylinder. Specifically, a band of plastic material 4 is provided at either end of the tubular container bodies 110, as shown in greater detail in FIG. 7. To this end, the operation of shear 100 and the passage of plastic material 4 through extrusion passage 18a is coordinated to provide axially spaced annular areas 112 of plastic material 4 on the cylinder on the plastic material 2 and to cut the tubular stock 108 in the center of the annular areas 112 to form annular bands 114 at either end of container body 108.

A measuring device 116, including measuring wheel 118, rotatable by the extruded cylinder of plastic material 2 may be used to record the length of the tubular stock issuing from coextrusion machine 14a. Measuring device 116 is coupled to shear 100 to actuate the shear when a quantity of tubular stock commensurate with the desired size of container body 110 has passed. Measuring device 116 is also coupled to control 32a which regulates the movement of plastic material 4 in extrusion passage 18a by means of motor 24a.

In operation, measuring device 110 measures the length of the plastic material 2 cylinder issuing from coextrusion machine 14a. After a predetermined length of tubular stock 108 has passed measuring device 116, the device causes control 32a to move plastic material 4 down extrusion passage 18a to coextrude plastic material 4 and susceptor 6 on the interior of plastic material 2 for a preset length of the plastic material 2 cylinder, after which the coextrusion stops. This forms the annular area 112 of plastic material 4 on the inside of plastic material 2 cylinder. The extrusion of plastic material 2 alone continues.

As the passage of the tubular stock extends, measuring device 116 actuates shear 100 to sever tubular stock 108 in the middle of annular area 112. The above process is then repeated and the resulting product is shown in FIG. 6 comprising a cylinder having a band 114 of plastic material 4 and susceptor 6 coextruded at either end thereof. The ends of the cylinder 110 may be affixed to container ends in the manner described in connection with FIG. 6 to provide the completed container.

If it is desired to avoid the unevenness in the thickness of the stratified material shown in FIG. 7 caused by the spaced coextrusion of plastic materials 2 and 4, plastic material 4 may be continuously coextruded with plastic material 2 but susceptor 6 only intermediately incorporated in plastic material 4. A stratified material so formed is shown in FIG. 8 and may be provided by connecting measuring device 116 to valve 40 in loading apparatus 38 for susceptor 6 so that the susceptor is periodically incorporated in plastic material 4 in extrusion passage 18a.

In the alternative, the thickness of each of the coextruded layers may be controlled to maintain the thickness of the stratified material constant. Thus as the layer of plastic material 4 is periodically coextruded with plastic material 2, the thickness of the latter may be reduced, as shown in FIG. 9 to maintain the thickness of the stratified material constant. This technique can be obtained by coupling measuring device 116 to the control for each of the coextrusion passages 16a and 18a to coordinately reduce the thickness of the layer of plastic material 2 when plastic materials 2 and 4 are being coextruded.

The use of the stratified material shown in FIG. 9 in a container permits the lid to overlap the container body, as shown in FIG. 10 since the coextruded plastic material 4 containing susceptor 6 may be placed inside the cap.

Various modes of carrying out the invention are contemplated as being within the scope of the following claims particularly pointing out and distinctly claiming the subject matter which is regarded as the invention.

I claim:

1. A method of forming a stratified material having an inductively heatable layer by coextrusion through a layer forming die, said method comprising the steps of:

providing a plurality of fusible thermoplastic compositions at first locations removed from the layer forming die;

moving the compositions from the first locations toward the die, the movement of at least one of the compositions being accompanied by an agitation thereof;

incorporating in the one composition, during its movement toward the die and by means of its agitation, a particulate susceptor in a size range of submicron to 20 microns and selected from a material class consisting of the oxides of iron and chromium having ferromagnetic properties;

heating the compositions to a malleable and fusible state during the movement; and forcing the compositions through the die into intimate contact with each other while in the malleable and fusible state to form joined layers of the compositions and the stratified material.

2. The method according to claim 1 wherein pressure is applied to the layers to assist in intimately joining them together.

3. The method according to claim 1 including an initial step of formulating each of the thermoplastic compositions to possess a property desired in the formed stratified material.

4. The method according to claim 3 wherein another of the thermoplastic compositions is rendered at least partially opaque, thereby to mask the composition layer containing the particulate susceptor in the finished stratified material.

5. The method according to claim 3 wherein at least one of the external layer compositions of the stratified material is formulated to be thermally joinable responsive to the heat generated in the particulate susceptor.

6. The method according to claim 1 wherein the incorporation step is further defined as incorporating the particulate susceptor in quantities of about 1 percent or more by weight with respect to the one composition.

7. The method according to claim 6 wherein the incorporation step is further defined as incorporating the particulate susceptor in quantities of up to 30 percent by weight with respect to the one composition.

8. The method according to claim 1 wherein the incorporation step is further defined as uniformly dispersing the particulate susceptor in one of the compositions.

9. The method according to claim 1 further defined as continuously carrying out the steps of the method.

10. The method according to claim 1 wherein the particulate susceptor is incorporated in the one of the compositions by directly mixing particles of the susceptor in the composition during its movement.

11. The method according to claim 1 including the initial step of incorporating the particulate susceptor in a predetermined quantity of the one composition and thereafter incorporating the quantity so treated in the moving composition.

12. The method according to claim 1 wherein the incorporation step is further defined as intermittently dispersing the particulate susceptor in the one composition during the movement of the composition to disperse the susceptor material in selected areas of the one composition.

13. The method according to claim 1 wherein the step of forcing the compositions through a die is further defined as continuously forcing at least one layer through the die while intermittently forcing another layer through the die to provide the other layer at selected areas of the first layer.

14. The method according to claim 13 wherein the step of forcing the compositions through a die is further defined as intermittently forcing the layer incorporating the susceptor through the die.

15. The method according to claim 14 wherein the step of forcing the compositions through a die is further defined as coordinately intermittently forcing one of the layers through the die and varying the thicknesses of the layers of the stratified material to maintain the overall thickness of the stratified material relatively constant.

16. The method according to claim 1 further defined as containing the additional step of cooling the stratified material.

* * * * *